Dec. 30, 1930.  J. WILSON  1,787,133
MEANS FOR REGULATING THE SPEED OF INDUCTION MOTORS
Filed March 20, 1925    3 Sheets-Sheet 1
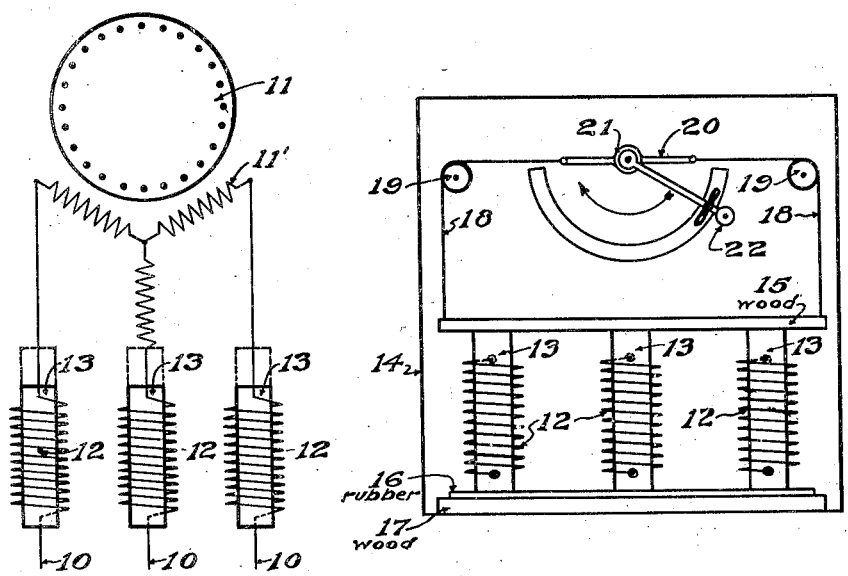
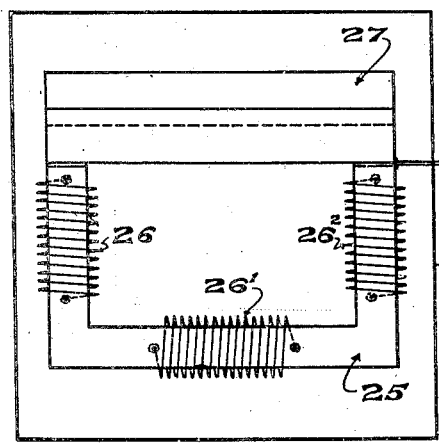
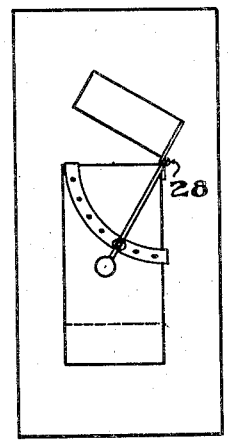
Fig. 1  Fig. 2  Fig. 3  Fig. 4
John Wilson.
INVENTOR.
BY
ATTORNEY.

Dec. 30, 1930.  J. WILSON  1,787,133
MEANS FOR REGULATING THE SPEED OF INDUCTION MOTORS
Filed March 20, 1925  3 Sheets-Sheet 2

John Wilson.
INVENTOR.
BY
ATTORNEY.

Dec. 30, 1930.  J. WILSON  1,787,133
MEANS FOR REGULATING THE SPEED OF INDUCTION MOTORS
Filed March 20, 1925  3 Sheets-Sheet 3
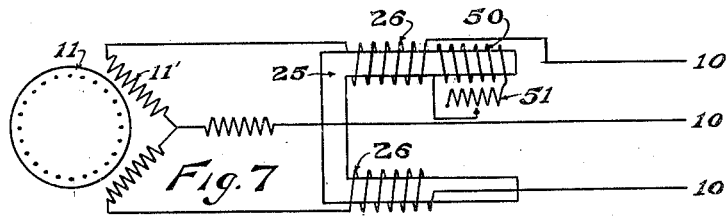
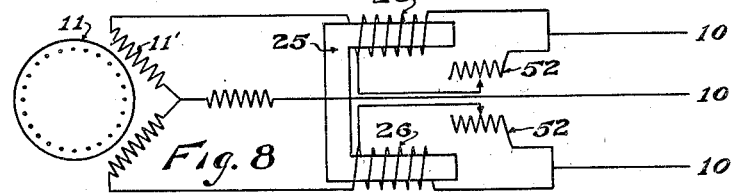
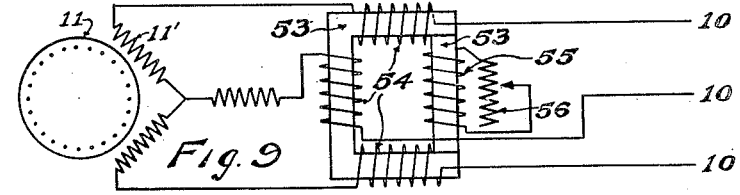
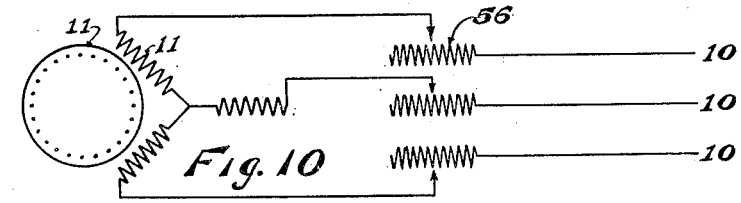
John Wilson.
INVENTOR.
BY
ATTORNEY.

Patented Dec. 30, 1930

1,787,133

UNITED STATES PATENT OFFICE

JOHN WILSON, OF CHICAGO, ILLINOIS, ASSIGNOR TO ILG ELECTRIC VENTILATING CO., A CORPORATION OF LOUISIANA

MEANS FOR REGULATING THE SPEED OF INDUCTION MOTORS

Application filed March 20, 1925. Serial No. 16,968.

My invention relates to improvements in means for regulating the speed of induction motors.

The object of this invention is to provide simple, practical, manually operable means for regulating, through a considerable range, the speed of an induction motor, more particularly of the squirrel-cage rotor type, although not necessarily limited to this type. By means of my improvement, the speed of such motors may be regulated throughout a wide range up to the maximum speed, and the motor may be maintained at any desired speed of rotation.

In the accompanying drawings, I have illustrated several embodiments of the invention, although it will be understood that other constructions are contemplated.

Fig. 1 is a diagram of one form of the invention.

Fig. 2 is a front elevation of the controller cabinet with the front removed, and shown somewhat diagrammatically.

Fig. 3 is a similar elevation of a modified controller.

Fig. 4 is a side elevation thereof.

Figures 7, 8, 9 and 10 are further diagrammatic showings of additional modified forms of the invention.

Figure 5:
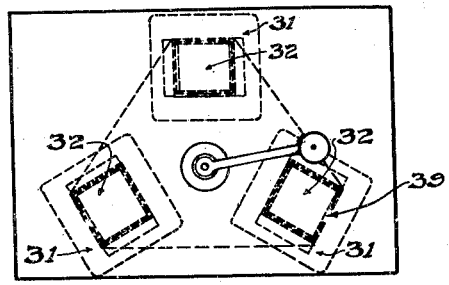
Fig. 5 is a plan view of an additional modification.

For purposes of illustration, I have shown in the drawings, diagrammatically, a squirrel-cage type of induction motor, although other types are contemplated. This motor may be used to operate a ventilating fan or other apparatus having similar load characteristics, the speed of rotation of which it is desired to vary.

Referring to the diagram, Fig. 1, a three-wire system is shown, the three conductors being indicated by reference 10. 11 indicates, diagrammatically, the rotor of an induction motor, and 11′ indicates the stator winding. In order to vary the speed of the rotating member of the motor, I provide suitable means for varying the inductance of the circuit, and for this purpose I provide an inductance coil 12 in series with each of the conductors 10. These coils are preferably so designed as to maintain a balanced circuit, although results partially as good may be obtained by fewer coils and an unbalanced current. A plunger or core 13 is provided for each coil 12, and in the form of invention shown in Fig. 1, the inductance of the circuit is varied by causing a relative movement of the cores and coils, i. e., by moving said cores in and out of the respective coils, or by moving the coils in relation to the cores, the former being preferred. This movement may be effected in several ways. In the form shown in Fig. 2, the coils are mounted in a row, in a box or container 14, and the three cores 13 are suspended in a row from a non-magnetic support 15. By moving this support up or down, the cores may be withdrawn from or inserted into the coils 12 an amount necessary to vary the inductance from a minimum to a maximum, or vice versa. When the cores are in lowermost position, the inductance is a maximum, and said plungers rest on a cushion strip 16, which may be of rubber or other resilient material, superimposed on a wooden support 17. The cross-bar 15 may be elevated by cables or chains 18 secured to opposite ends thereof, and passing over pulleys 19 to opposite ends of a pivoted bar 20, or it may be elevated by any other form of link and crank, or gear motion. Said bar 20 is rocked about its support 21 by means of a manually operable lever 22 extending outside the casing.

With the arrangement shown, the speed of the motor may be increased by simply swinging the controlling lever through an arc of a circle after the manner of the usual controller handle.

In the form of the invention shown in front elevation in Fig. 3, and in side elevation in Fig. 4, instead of three separate cores, a U-shaped magnetic member 25 is provided having three coils 26 wound on the three different sections thereof, with a movable member 27 of magnetic material adjacent the ends of the U-shaped member. The movement of said member 27 toward and away from the ends of the U-shaped member varies the reluctance of the air-gap, thereby varying the inductance of each of the three coils and the circuit in which they are connected, which in turn varies the speed on the motor. In the form shown, said magnetic member 27 is hinged near one end or at one edge, as at 28, and is provided with an operating lever 29; whereby said lever may be swung through an arc of a circle to swing the member 27 about its supporting hinge, to move said magnetic member closer to or farther from the main core 25.

Figure 6:
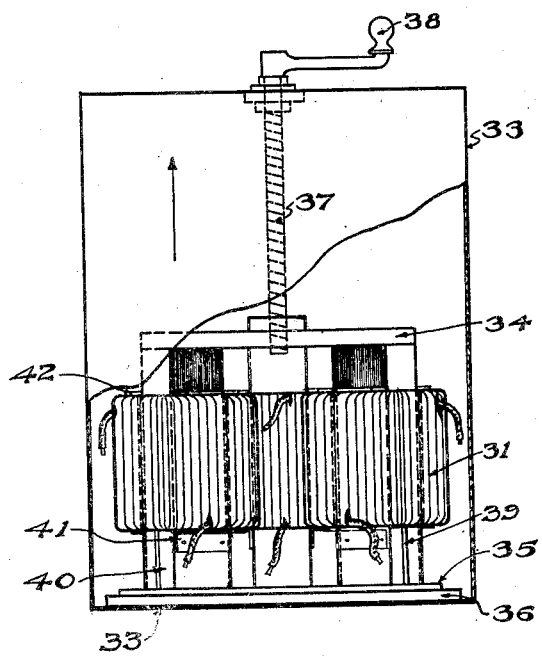
Fig. 6 is an elevation thereof.

Another embodiment of the invention is shown in Figs. 5 and 6, in which coils 31 and laminated cores 32 are placed approximately 120 degrees apart, in a suitable housing 33, in order that the influence of the coils upon each other may be uniform. Said cores are fastened to a supporting member 34. The base plate is preferably made of suitable non-conducting material 35, 36, although the housing 33 is preferably made of steel, and in either case the coils as shown in Fig. 6 are spaced above the base, thus affording better ventilation and reducing eddy-currents. The cores are moved up and down by means of a screw threaded shaft 37 which passes through a screw threaded opening in the supporting member 34. Turning the screw 37 by means of the handle 38, raises or lowers all of the cores 32 simultaneously, and holds them in any position of vertical adjustment without additional clamping.

Each coil 31 is supported on a rectangular shaped tube 40 which is made with a slot 39 (Fig. 5) which extends the entire length of the tube 40, preventing circulating currents in said tube. The location of the coil 31 is made definite and permanent by the supporting brackets 41, which are fastened to the tube 40 and also by lugs formed by bending over the top of the tube, as shown at 42.

Fig. 7 shows diagrammatically another arrangement to accomplish the same result without moving the main core or coils. The U-shaped magnetic core 25 is fitted with coils 26 and one leg of the core is fitted with an additional coil 50 with an adjustable rheostat 51 in series with it. When current is flowing in the motor winding through coils 26 current is induced in coil 50 which counteracts the main current in coil 26. The amount of current in coil 50 may be controlled by adjusting rheostat 51. This action increases or decreases the inductive reactance in coils 26, thereby varying the voltage across the motor terminals of winding 11'.

Fig. 8 shows other means which may be used for varying the inductive reactance of coils 26 by shunting them with a variable resistance 52. When all the resistance is cut out, the reactance coils are short-circuited and no current flows in them.

Fig. 9 shows another form that has been tried with good results. The closed core 53 is assembled with three coils 54, one for each phase, and another coil 55, with a resistance 56 in series with it. By varying the resistance in series with coil 55, a choking effect is produced, which, in turn, causes the speed of the motor to vary.

Fig. 10 is a circuit diagram in which the E. M. F. at the motor terminals is reduced by variable resistance 56, causing a reduction in speed.

Although a three phase, three-wire system is shown, the invention is not limited thereto, as it is applicable also with single phase or two phase circuits, and two, three, four or six wire circuits.

The invention is particularly applicable to ventilating fans, in which the load increases as the cube of the speed of rotation. It is also specially applicable to any service of such character that the load increases at a much faster rate than the rate of increase of the speed of rotation, and vice versa; that is where a decrease of speed results in a decrease of load at a much more rapid rate than the rate of speed decrease, even as great as the cube of such decrease.

Where a ventilator fan is driven by an induction motor of the squirrel-cage rotor type, the speed of the fan is substantially constant. If it is desirable in winter to operate the fan at a slower speed to avoid removing too much warm air from the building, the practice at the present time, in some instances, is to provide two motors of different capacities, one for driving the same fan or another fan at a slower rate. This practice is obviously unsatisfactory and costly, involving a duplication of equipment or change of existing equipment with the changing seasons. This difficulty is done away with by the use of the improvements described herein.

What I claim as new is:

1. A regulator for ventilating fan motors of the squirrel cage type, comprising a housing having a base, three tubes mounted on said base and spaced substantially equi-distant from each other, a coil surrounding and carried by each of said tubes, above said base, to minimize eddy-currents and afford ventilation, a supporting member above said coils, three cores secured to said member and extending into said tubes and a shaft secured to said support and passing up through said casing whereby said cores may be raised and lowered simultaneously from outside said casing.

2. A regulator for ventilating fan motors of the squirrel cage type, comprising a housing having a base, three coils spaced above said base and arranged equi-distant from each other, a supporting member above said coils, three cores secured to said member and extending into said coils, a screw threaded shaft cooperating with said support and with the wall of an opening in said casing, and a handle on said shaft, outside said casing, whereby said cores may be raised and lowered simultaneously from outside said casing to vary the inductive reactance of the fan motor supply circuit.

In testimony whereof, I have subscribed my name.

JOHN WILSON.